J. W. HILTON.
BELTING.
APPLICATION FILED AUG. 9, 1905.
967,379.
Patented Aug. 16, 1910.
WITNESSES
INVENTOR
John W. Hilton
by Paul Finckel
Attorney.

UNITED STATES PATENT OFFICE.

JOHN W. HILTON, OF BELLEVUE, KENTUCKY.

BELTING.

967,379.  Specification of Letters Patent.  Patented Aug. 16, 1910.

Application filed August 9, 1905. Serial No. 273,480.

*To all whom it may concern:*

Be it known that I, JOHN W. HILTON, a citizen of the United States, and a resident of the city of Bellevue, in the county of Campbell and State of Kentucky, have invented certain new and useful Improvements in Belting, of which the following is a specification.

The length of all belting such as cotton, linen, or other vegetable material, and also of leather belting will vary according to the dryness or moistness of the atmosphere in which it is. In lumber mills, in the country and forest districts, and in the mill machinery connected with the great number of oil factories of the companies that obtain oil from the earth and load it, work it and refine it, the belting is usually either under a roof, of a structure whose sides are open to the ingress of the outer atmosphere, or out in the open with no protection whatever. The same is true as to mills used for the manufacture of brick and in machinery for many industries carried on in the open air, including many of the farm machines, for agricultural purposes. Damp air or rain does greatly lengthen the belt, and in the absence of moisture during dry weather, the belt will greatly contract. Those acquainted with the use of belting know that such changes in the length of the belting greatly interfere with the efficiency of the machinery operated by the belting. If the belt, when dry, is of the correct length, it will, when dampened or wet, be too long, and will slip on the pulleys and irregularly and feebly operate the mechanism it is employed to work. If the belt, when damp, is of correct tension, then when dry, it has contracted and is too tight, and either breaks or wears out prematurely.

It is the object of my invention to furnish a belting which shall be water-proof, and thus not subject to the injurious action of the changes of weather, as above set forth.

Another of the principal objects of my invention is to strengthen the fiber and the yarn of the belting, and thus strengthen the entire fabric. This addition of strength is made without interfering with the necessary flexibility of the belting. Therefore the advantage of such a change in the belting is obvious. Other minor advantages will be hereinafter apparent.

The several features of my invention and the various advantages resulting from their use conjointly or otherwise will be apparent from the following description and claims.

In the accompanying drawing I show, conventionally, a section of textile fabric belting, with descriptive inscription thereon.

I will now proceed to describe my invention in detail. I will describe the same as applied to cotton belting, premising that the invention will be the same in relation to belting made of flax (linen) or other fibers.

I provide a liquid consisting of asphalt, mineral rubber and naphtha, or other agent that will dissolve the asphalt and mineral rubber and will thereafter dry. I prefer naphtha because it dries quickly. This I apply to the belting. The preferred mode of the application of it to the belting is as follows: I duly soak the belting in it, and when the liquid has permeated the goods and coated all of the fibers, and as far as may be, permeated the fibers themselves, I remove the belting from the liquid and put it to dry. I find the best results are obtained when the belting soaked in and coated with the waterproofing material is held under tension while the waterproofing material dries. When dry, the belting is flexible. It is impervious to moisture. Consequently it does not stretch. It becomes a standard and efficient and most valuable article.

The ordinary advantages of a strong belt are too obvious to need mention here. One advantage of this added strength is as follows: The warp of ordinary cotton belting is somewhat movable. Hence when the lacing or other means of connecting together the belting, so as to make an endless belt, are applied, the kind of lacing must be especially adapted to grasp much of the belting and in a firm manner. Otherwise the woof or filling of the belting will be pulled out by the lacing. After the belting has been treated by my invention, the woof is stuck fast or cemented to the warp, and will not easily or readily yield, or slide upon the warp. Hence the fabric requires less complicated means for lacing and will be more serviceable. This cementing of the woof everywhere throughout the belting, as is the case by my invention, obviously confers much additional strength upon the entire fabric.

I desire it to be understood that the waterproofing liquid, consisting of the materials first herein named in its application to the belting is the best waterproofing material I have found for obtaining the best waterproof belting and for securing the best results from the belting when in use. This material thus applied prevents the fiber from stretching, adds strength to the fiber, as well as strength to the fibers and to the warp and woof combined, and prevents the belt from being pulled out at the ends. The belt thereafter requires no belt dressing as is now usually the case.

Mineral rubber is a name applied to a composition of materials, and derives this name from the fact that it has elasticity and possesses a high melting point. It is a manufactured product combining several ingredients. It contains a high per cent. of bitumen, and is a pure hydrocarbon, ninety-nine per cent. This mineral rubber mixed with asphalt and naphtha and applied to the textile belting, renders the belting waterproof and also elastic to the extent that the fibers of the belting as they are bent around the pulley do not crack but easily and gently conform to the curve and regain their original condition of straightness without injury, when they are in that straight part of the belt which is for the time being between the pulleys.

What I claim as new and desire to secure by Letters Patent, is:—

1. A belting composed of a textile fabric impregnated with a waterproof composition, consisting essentially of asphalt, and mineral rubber, substantially as and for the purposes set forth.

2. A belting composed of a textile fabric, the warp and the woof of which are respectively impregnated with a waterproof composition consisting essentially of asphalt, and mineral rubber, substantially as and for the purposes specified.

3. A belting composed of a textile fabric, the warp and the woof of which are respectively impregnated with a waterproof composition and the interstices between said warp and woof filled with said composition, said composition consisting essentially of asphalt, and mineral rubber, substantially as and for the purposes specified.

4. A belting composed of a longitudinally stretched textile fabric, impregnated with a waterproof composition, consisting essentially of asphalt, and mineral rubber, substantially as and for the purposes specified.

JOHN W. HILTON.

Attest:
JOHN E. FITZPATRICK,
K. SMITH.